United States Patent [19]

Williams

[11] 4,082,437
[45] Apr. 4, 1978

[54] GAME HAVING OPTICAL PRESENTATION AND APPARATUS THEREFOR

[75] Inventor: Jake Millard Williams, New York, N.Y.

[73] Assignee: Nolte and Nolte, P.C., Jericho, N.Y.

[21] Appl. No.: 563,236

[22] Filed: Mar. 28, 1975

Related U.S. Application Data

[63] Continuation of Ser. No. 293,220, Sep. 28, 1972, abandoned.

[51] Int. Cl.² ............................................. G03B 21/04
[52] U.S. Cl. ................................. 352/123; 273/94 R; 352/72; 352/131; 352/239; 352/83
[58] Field of Search ................. 352/72, 123, 131, 239, 352/83; 273/94

[56] References Cited

U.S. PATENT DOCUMENTS

| | | | |
|---|---|---|---|
| 3,164,059 | 1/1965 | Turrentine | 352/123 X |
| 3,296,926 | 1/1967 | Kapilow | 352/119 X |
| 3,482,907 | 12/1969 | Michelson | 352/239 |
| 3,563,547 | 2/1971 | Marsh | 352/123 X |
| 3,586,431 | 6/1971 | Fraser | 352/123 X |

Primary Examiner—Monroe H. Hayes
Attorney, Agent, or Firm—Nolte and Nolte

[57] ABSTRACT

A game simulating a sport such as football employs film sequences of plays of an actual game, using cassettes of film of equal length regularly disposed sequences. A sequence selecting apparatus and projector projects a given sequence determined by the selection of cassettes by one player and selection of sequence by another player. The apparatus employs a take-up reel upon which the film is wound before play to align the beginning of a sequence with an optical projection system, and spiral groove control device coupled to the reel for controlling the rotation of the reel to effect the projection of a single sequence. The optical system projects through apertures in the film cassette, and the shutter is operated by a sprocket coupled to the film.

20 Claims, 12 Drawing Figures

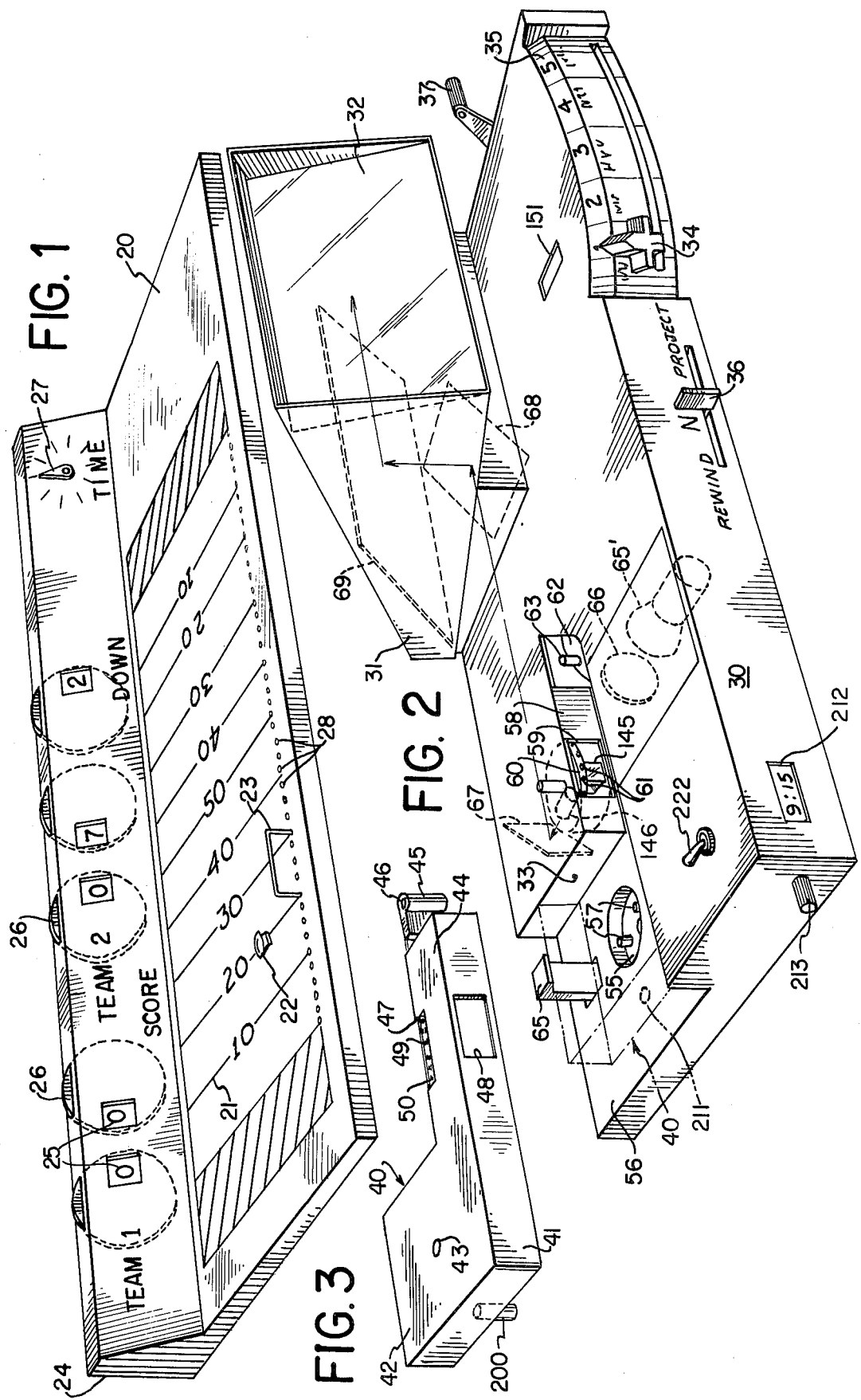

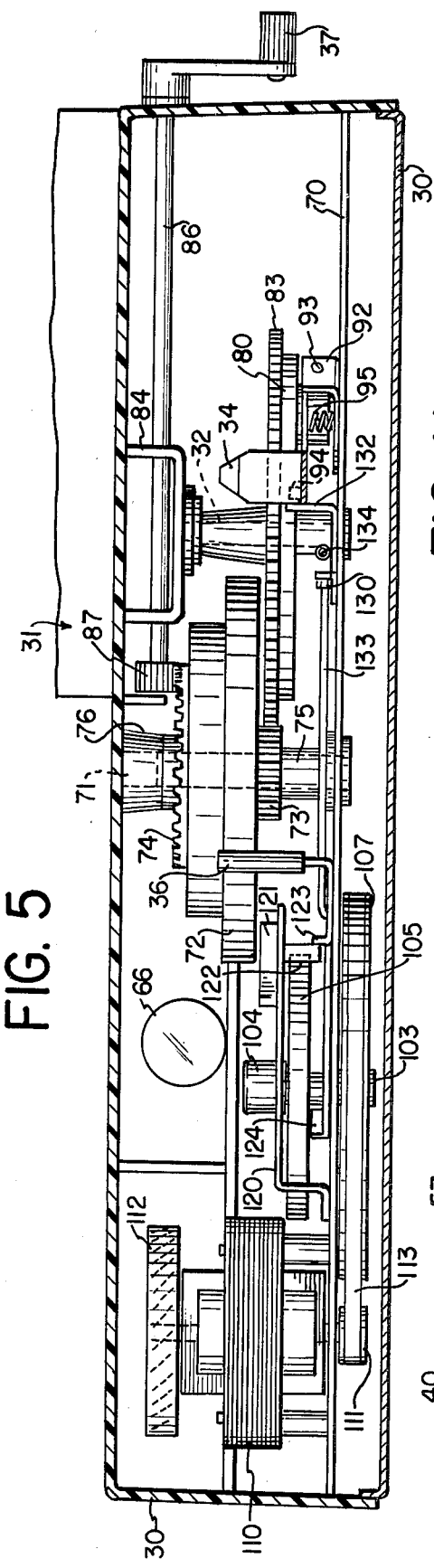
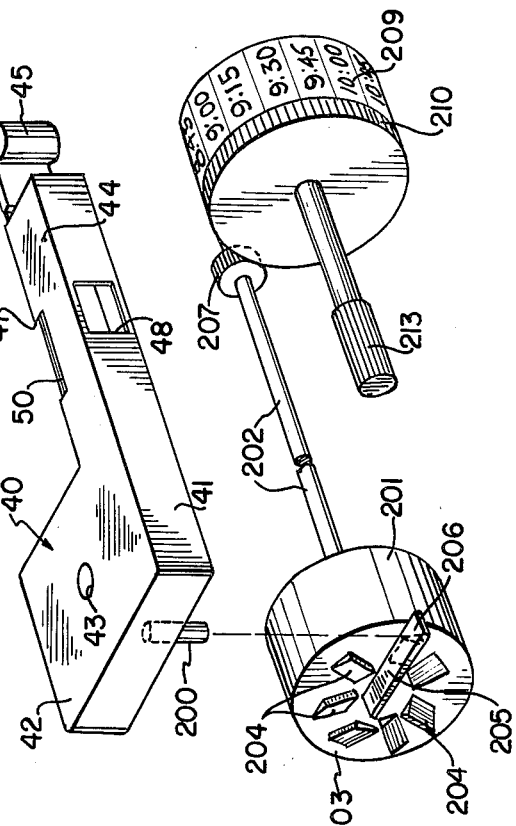
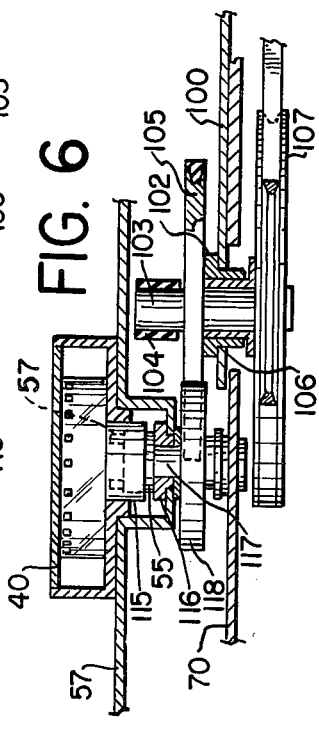
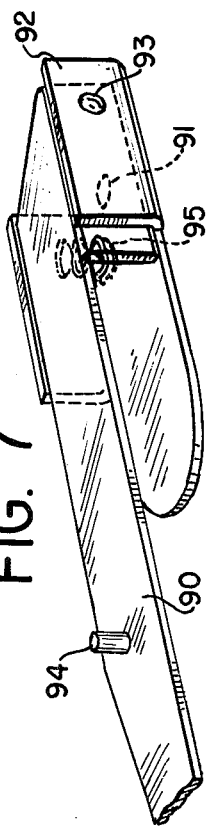

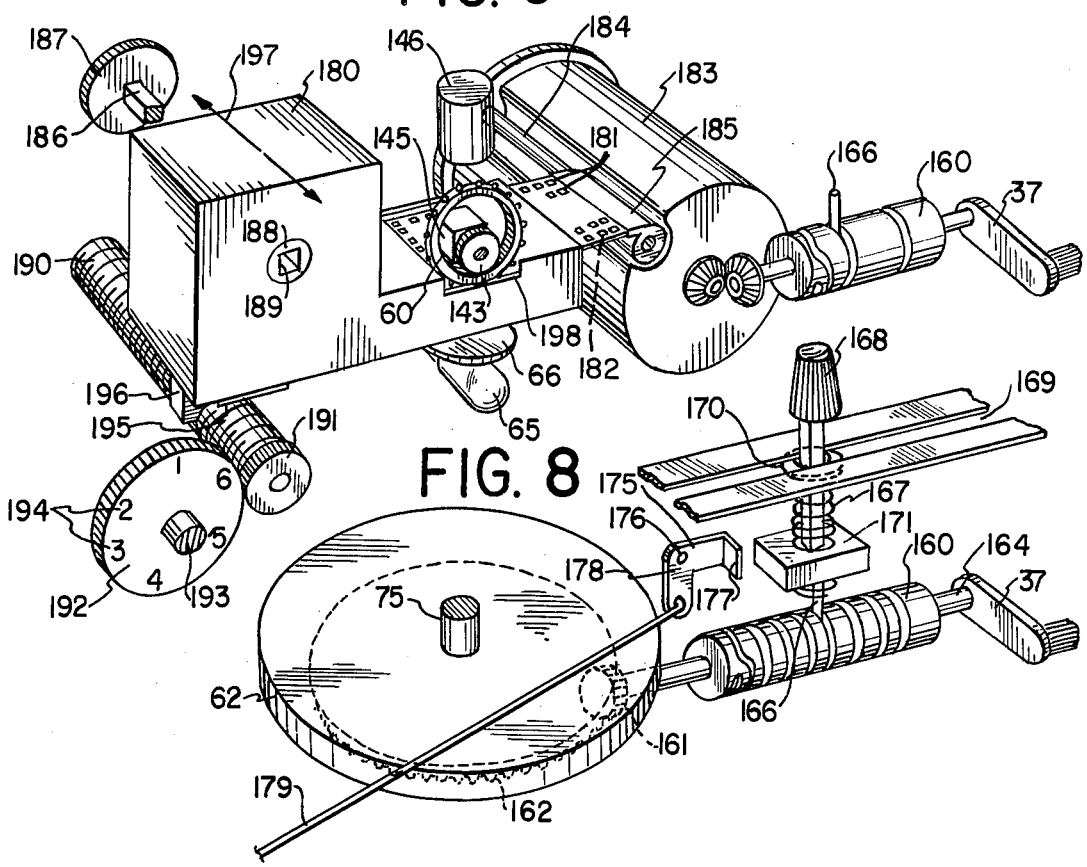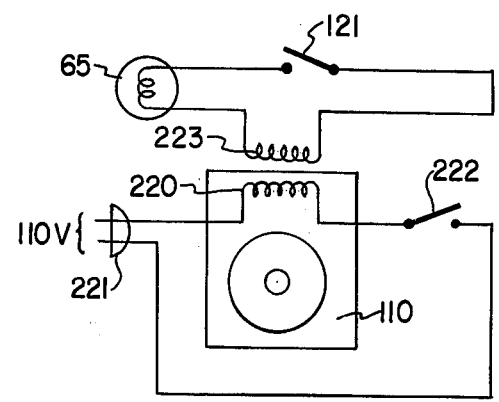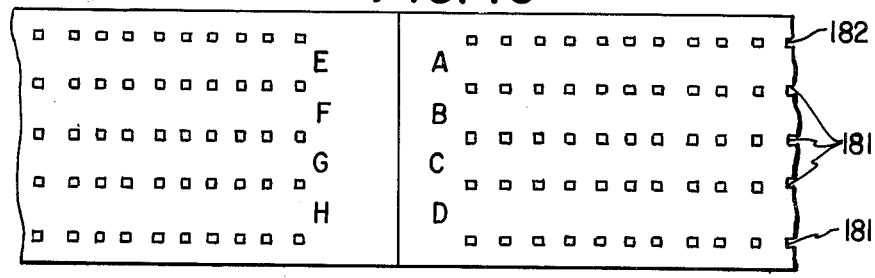

GAME HAVING OPTICAL PRESENTATION AND APPARATUS THEREFOR

This is a continuation of application Ser. No. 293,220 filed Sept. 28, 1972 now abandoned.

This invention is related to a game employing an optical projection system and a film or tape selecting system, and the apparatus employed therein, and is more particularly directed to the type of game simulating insofar as possible a sport activity, such as football. It will be apparent, of course, that while the following disclosure is directed solely to embodiments of the invention relating to football, this description in exemplary only, and it will be apparent that the game and associated apparatus may be readily adapted for simulating other sports activities within the contemplation of the invention.

Many games have been provided, both simple and complex, simulating various sports activities. For example, considering the sport of football, such games frequently employ scoring boards simulating a football field and means for determining the outcome of the various plays, so that score may be kept on the board during the process of a play. For example, each player may be provided with a plurality of switches which he selectively pushes, the outcome of a play being determined by the combination of switches pushed by the two players. Frequently in such games a chart must be consulted to determine the results of the play.

While such games do simulate in certain respects plays corresponding to plays which may be expected in an actual game, it has been found that the games appear remote from the actual game of football, and the possible plays are limited.

According to the present invention, a new game simulating a sport activity is provided in which film cassettes are provided each incorporating a number of plays from actual or staged games. The sequence for each play, following the projection of the sequence, indicates the outcome of the play, so that the number of plays which can be representative is limited only by the number of film cassettes which the players have available.

The invention also incorporates an apparatus having an inexpensive and easily fabricated system for selecting and projecting the play sequences on the film. It is apparent, for example, that in order to make such a game feasible, it must be possible to readily select and project one sequence from the film of a selected cassette. In order to accomplish this, the apparatus employs a take-up reel to which the free end of the film is connected, the perimeter of the take-up reel having a given fixed relationship to the length of each sequence on the film. Means are provided for rotating the take-up reel to selectively align the beginnings of the film sequences with a projection system, and for thereafter during projection of the film to wind the film on the take-up reel for a single film sequence. For this purpose, the invention provides an element having a spiral groove, such as a rotatable disk or cylinder coupled to the take-up reel. A pin rides in the groove, so that the pin has a locus of movement as the spiral groove is rotated. A releasable stop is placed in the path of the locus of movement of the pin at a determined point, so that during the initial preadjustment of the apparatus in winding the film to the selected sequence, the take-up reel is stopped when the pin strikes the releasable stop. The rotation of the spiral groove bears a fixed relation to the rotation of the take-up reel, which in turn bears a fixed relation to the length of the film sequence, and the pin may be manually positioned at points in the groove along the locus of movement of the pin which are separated by distances corresponding to the length of film, thereby permitting the stopping of the film at the beginning of any desired sequence.

A fixed stop is also provided in the path of the movement of the pin, the fixed stop being displaced from the releasable stop by distance corresponding to one sequence of the film, so that upon release of the releasable stop, a motor operated mechanism can advance the film for a single sequence.

The motor operated mechanism may also be coupled to the film cassette to effect the rewinding of the film into the cassette.

In accordance with a further embodiment of my invention, the film cassette is provided with an extension through which the film passes, the extension having aligned apertures on opposite sides thereof to define an optical projection path passing through the film. The free end of the film has a coupling member which is readily affixable to the take-up reel in such a manner as to maintain a desired relationship between the rotation of the take-up reel and the film viewable in the projection system. The projection system is preferably turned on only when the motor system is coupled to the take-up reel during the time that the pin is between its two above mentioned stops. In addition, in order to insure synchronism of the shutter mechanism of the projection system, the shutter mechanism employs a sprocket wheel which engages sprocket holes in the film exposed in the aperture in the extension thereof, so that the sprocket drives the shutter mechanism only in response to movement of the film. For this purpose, it is preferred that the shutter mechanism be in the form of a rotating prism.

While the invention is particularly adaptable to film in which play sequences are sequentially arranged throughout the length of the film, it is also adaptable to film in which the play sequences are arranged in side-by-side tracks on the film, or alternatively, in which both sequential and side-by-side arrangement of the film sequences is provided.

Thus, briefly stated, in accordance with the invention, one player selects a cassette to be employed in a given play, and by means of the apparatus of the invention, the other player selects the sequence of the cassette which will be projected. The results of the play are consequently determined by the coincidence of the two selections.

In order that the invention will be more clearly understood, it will now be described in greater detail with reference to the accompanying drawings, in which:

FIG. 1 is a perspective view of a game board which may be employed in the game of the invention;

FIG. 2 is a perspective view of a selecting and projecting apparatus which may be employed in accordance with one embodiment of the invention;

FIG. 3 is a perspective view of a film cassette which may be employed in combination with the apparatus of FIG. 2;

FIG. 5 is a view of a portion of the front of the apparatus of FIG. 2 partially in cross-section, with the front cover removed;

FIG. 6 is a partially cross-sectional view of a portion of the apparatus of FIG. 4 taken along the line 6—6;

FIG. 7 is a perspective view of an operating lever assembly for use in the arrangement of FIGS. 2-5;

FIG. 8 is a perspective view of a portion of a modification of the apparatus of FIG. 4;

FIG. 9 is a perspective view of a portion of a further modification of the apparatus of FIG. 4, and illustrating a modification of the film cassette;

FIG. 10 is a top view of a modified film which may be employed in the apparatus of FIG. 9;

FIG. 11 is a perspective view of a portion of a timing mechanism which may be employed in combination with the system of FIG. 4; and FIG. 12 is a simplified schematic diagram of an electric circuit which may be employed in the arrangement according to the invention.

Figure 4:
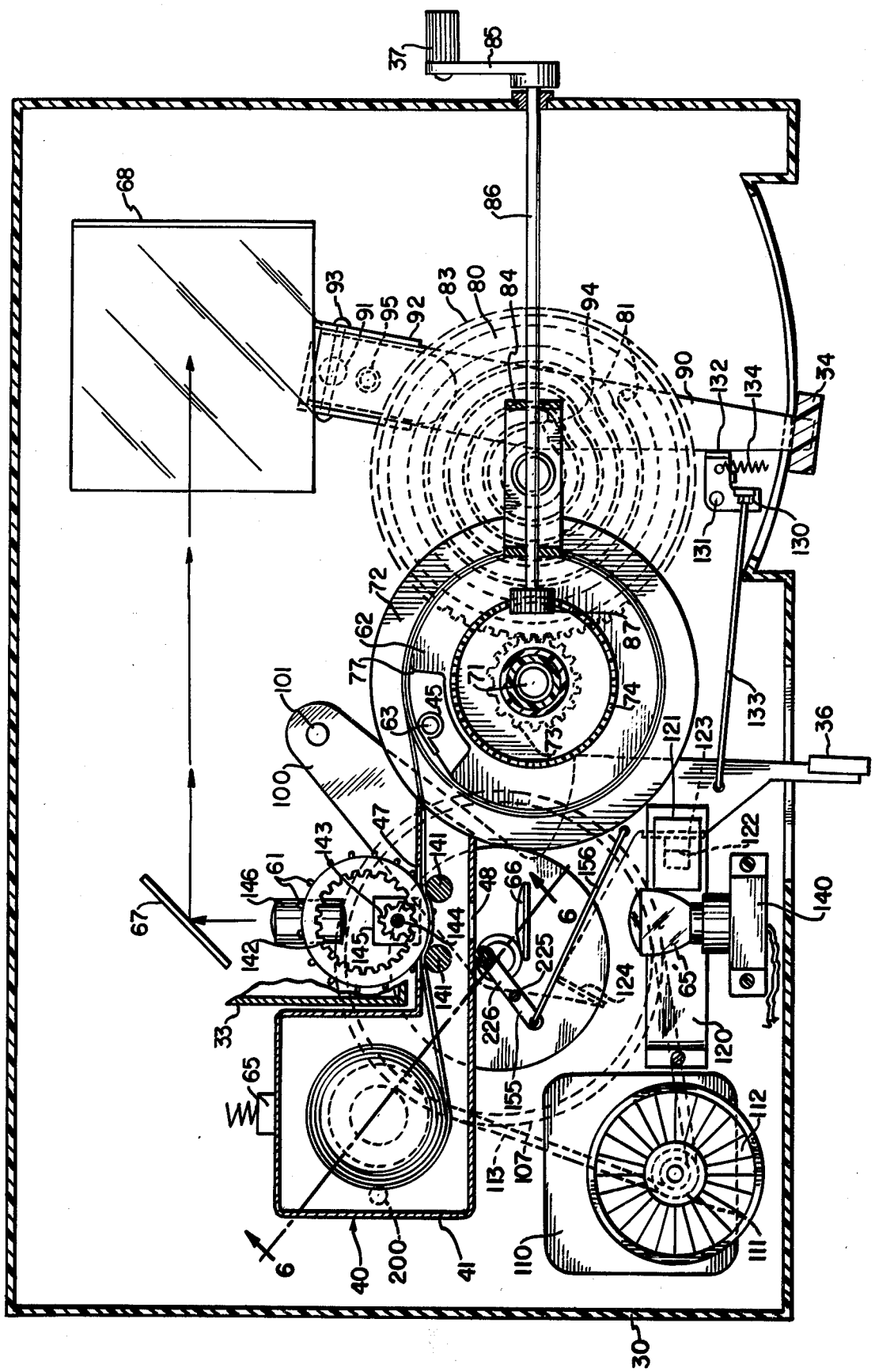
FIG. 4 is a top view of a portion of the apparatus of FIG. 2 with the top cover removed, a portion thereof being in cross-section, and illustrating in cross-section a cassette of film in position for projection.

One embodiment of a game in accordance with my invention is illustrated in FIGS. 1-3, wherein FIG. 1 illustrates a game board which may be employed to keep score, FIG. 2 illustrates the apparatus for selecting and displaying the results of plays, and FIG. 3 illustrates a form of film cassette that may be employed in the apparatus of FIG. 2. It is evident that the elements of the game illustrated in FIGS. 1-3 are directed to a game simulating football, and the following disclosure will be limited to such a game and modifications thereof, although it is apparent that the concept and apparatus according to my invention may be modified to permit adaptation of a game to other modes of operation without departing from the spirit and scope of the invention.

FIG. 1 illustrates a typical board which may be employed to keep score when employing the apparatus of FIG. 2. This board includes a generally flat surface 20 upon which is marked a grid 21 corresponding to a football playing field. A movable marker 22 simulating a football is positioned on the grid 21 for movement by the players in accordance with the outcome determined by the apparatus of FIG. 2. A ten yard marker 23, also movable on the board, for example being selectively insertable in the series of sideline holes 28, is provided for readily ascertaining the advance of the ball in accordance with conventional football rules. The board may be provided with an upright extension 24 along one edge, the extension 24 having a plurality of windows 25 positioned at the periphery of a plurality of rotatable disks 26 having suitable numbers impressed thereon, in order to enable the display of certain information, such as the score of each team and the number of the down during the progress of a game. Edges of the disk 26 may extend above the extension 24 as shown to permit variation of the indicia as the game proceeds. In addition, the board of FIG. 1 may include a time marker 27 to permit the manual adjustment of the time of each play, so that the game will last for an arbitrary predetermined period of time. For example, each play may be accorded a given time period, or the time of each play may be indicated by the apparatus of FIG. 2, as will be described in greater detail in the following paragraphs. Alternatively, as will be disclosed, an automatic time marking arrangement may be employed in the device of FIG. 2, so that the time marker 27 may be omitted. The arrangement of FIG. 1 is illustrative only, and it is apparent that many modifications and variations may be made therein in order to enable the display of a football game and the keeping of score, etc.

Before proceeding with a description of the apparatus of FIGS. 2 and 3, and in order to enable a clearer understanding of the invention, a brief description of the concept of the game will first be given.

The game in its simplest form is played by two players, each representing a separate team. In order to play the game, the players are provided with an apparatus for selecting plays and for determining the outcome of the selected plays, a plurality of film cassettes, such as illustrated in FIG. 3, and a score keeping board as exemplified by the board of FIG. 1. One player who, at a given point of the game, is considered to be the offensive team, selects for the next succeeding play one of the film cassettes. Each film cassette may be marked to indicate that it corresponds to a particular form of play, for example, a forward pass play, a running play, a kickoff play, a field goal play, etc., and the film in each cassette will consist of a series of sequential displayable plays. For example, a film cassette identified as forward pass plays will have a series of sequentially displayable motion picture sequences of forward pass plays against which different defenses have been employed. The film sequences may be derived from actual football plays, or they may be staged solely for the purpose of preparing the film for the game. Thus, by selecting the cassette marked "Forward Pass Plays", the offensive player will know that in the next succeeding play his side will attempt to make a forward pass, although he will not know at this time which specific sequence in the cassette will be displayed. Without informing his opponent of the indicia of the selected cassette, the offensive player inserts the selected cassette in the apparatus according to the invention.

Following the selection of the cassette and the insertion thereof in the apparatus, the defensive player sets the apparatus to determine which of the film sequences in the cassette will be displayed. He does this of course without knowing which cassette has been selected, so his choice may be a matter of strategy or chance. Based upon this selection, the apparatus advances the film to the given selected sequence, and optically displays it upon a screen. The players then view the screen to watch the play, be it a representation of an actual or a staged play, to determine the outcome of the particular offensive and defensive selections. The last frame of the sequence may be held to give an indication of the outcome of the play, and the players thereupon adjust the position of the markers as necessary on the playing board of FIG. 1 prior to proceeding with the next play.

Referring now to FIG. 2, one embodiment of an apparatus in accordance with the invention is comprised of a housing 30 for enclosing the working components of the apparatus. A screen assembly 31 including a viewing screen 32 is mounted on top of the housing 30, so that the screen 32 will be visible to each of the players. A cassette receiving recess 33 is provided in the top of the housing 30 at one side thereof for receiving a selected film cassette. A first control knob 34 projects from the housing in alignment with a suitable scale 35 to enable the selection of a defensive play by the defensive player. A second control knob 36 projects from the housing 30, the knob 36 having a central neutral position, a "Rewind" position to permit rewinding of film back into the cassette, and a "Project" position to permit the projection and display of the desired film sequence. In addition, a crank handle 37 may be provided for manually winding the film to a given sequence prior to display thereof. The film winding handle may of course be omitted if the device is adapted to perform this function automatically.

Referring now to FIG. 3, a film cassette 40 in accordance with one embodiment of the invention is comprised of a generally L-shaped housing 41 one end 42 of which is generally square in cross-section to contain a roll of film. The roll of film is suitably mounted on a conventional reel, which does not appear in FIG. 3, the reel being mounted for rotation, for example, about the axis of pivot 43. The free end of the film extends longitudinally through the leg 44 of the housing and is provided with a termination clip member 45 having an aperture 46 extending therethrough and parallel to the rotational axis of the roll of film. One edge of the leg 44 is provided with a notch 47 and the other edge of the leg 44 is provided with a window 48 aligned with the notch 47. As will be more apparent in the following description, the film, of which a portion 49 is shown exposed in the notch 47, is directed within the housing to pass along the notch 47, so that the sprocket holes 50 therein can drive a shutter mechanism which will be described in the following paragraphs.

Referring again to FIG. 2, the recess 33 in the housing 30 is shaped to receive the cassette 40. A drive wheel 55 is provided in the bottom 56 of the recess 33 to permit the rewinding of the film into the cassette. For example, the drive wheel 55 may be provided with upstanding pins 57 positioned to engage suitable recesses in the reel of the cassette to effect the rotation of the reel. This detail will also be shown in greater detail in the following paragraphs. The extension 58 of the recess 33 into which the leg 44 of the cassette is adapted to be inserted is provided with an opening 59 aligned with the notch 47 of the cassette, and a sprocket wheel 60 extends into the recess extension 58 to permit engagement of the sprocket pins 61 thereon with the sprocket holes of the film. A reel 62, a portion of which is visible in the view of FIG. 2, is provided with an upstanding pin 63 on its periphery which in the unloaded condition of the apparatus is accessible within the recess extension 58. Thus, in the loading of the cassette of FIG. 3 into the apparatus of FIG. 2, the cassette is moved downwardly into the recess 33 so that the pin 63 extends into the aperture 46 in the film end member 45. When the cassette is thus inserted, it is apparent that the portion 49 of the film exposed in the notch 47 must be out of engagement with the sprocket pins 61, to prevent damage to the film during insertion. Suitable means to be described in detail in the following disclosure are provided in order to move the film into engagement with the sprocket pins 61. A spring biased lever 65 extending from the bottom 56 of the recess 33 may be provided to engage the edge of the cassette to hold it in position as the play proceeds.

In order to facilitate the explanation of the optical system of the apparatus in accordance with the invention, some of these elements which are within the housing 30 have been illustrated in dashed lines in FIG. 2. Thus, a projection lamp 65 is positioned within the housing 30 on the side of the recess extension 58 opposite the aperture 59, to direct light through a condensor 66 toward the sprocket wheel 60, a suitable window in the side of the recess extension 58 being provided (which does not appear in FIG. 2), so that light from the lamp 65 may pass through the window 48 of the cassette to illuminate the portion 49 of the film. Light transmitted through the film then passes through a shutter assembly 145 associated with the sprocket wheel 60, the light then being directed by way of projection lens 146 to a mirror 67 which directs the image on the film to the screen 32 by way of suitably disposed mirrors 68 and 69. The mirrors employed within the apparatus are of course dependent upon the configuration of the apparatus and the desired location of the screen, and it will thus be apparent that such mirrors may be suitably arranged to project the image on the screen 32 in view of these factors.

The internal mechanism within the housing 30 is more completely illustrated in FIGS. 4, 5 and 6. FIG. 4 is a top view of the apparatus with the top of the housing 30 removed, and illustrating the cassette 40 in position and in cross-section, FIG. 5 is a front view of the components within the housing 30, with the front of the housing removed, and FIG. 6 is a partially cross-sectional view of a portion of the apparatus taken generally along the lines 6—6 of FIG. 4.

As seen in FIG. 5, a horizontal chassis 70 is provided near the bottom of the housing 30. The take up reel 62 is mounted for rotation about a vertical shaft 71 extending upwardly from the chassis 70. Also mounted on the shaft 71 are a rim drive wheel 72 below the reel 62, a pinion gear 73 below the rim drive wheel 72, and a gear 74 having axially extending teeth positioned above the take up reel 62. Suitable bushings 75 and 76 may be provided to space the rotatable elements from the chassis 70 and the top of the housing 30 respectively. The take up reel 62, the rim drive wheel 72, and the gears 73 and 74 are suitably affixed together for rotation in common. The rim drive wheel 72 preferably has a larger diameter than the reel 62 to serve as a guide for the bottom of the film. As more clearly seen in FIG. 4, the reel 62 is provided with a cut out section 77 in which the pin 63 is mounted, the pin thus being affixed to and extending upwardly from the rim drive wheel 72.

A cam wheel 80 having a spiral cam groove 81 on its lower surface is mounted for rotation about a vertical shaft 82 extending upwardly from the chassis 70. The outer perimeter of the cam wheel 80 is provided with gear teeth 83 positioned to engage the pinion gear 73. The top of the shaft 82 may be held in a bracket 84 extending from the top of the housing, and suitable bushings are provided to axially align the cam wheel 80. The crank 37 is connected to a shaft 86 journaled in the bracket 84, the end of the shaft 86 carrying a pinion gear 87 which engages the teeth of the gear 74, so that the reel 62 may be turned by means of the crank 37.

The defensive play control knob 34 is connected to a horizontally extending lever 90, which is positioned beneath the cam wheel and pivotted for movement about an axis 91. For example, as shown more clearly in FIGS. 4, 5 and 7, a U-shaped bracket 92 having a bottom web may be pivotally affixed to the chassis 70, with the lever 90 being pivotted between the legs of the bracket 92 about an axis 93 which may be comprised of rivets 93 extending through the legs of the bracket 92 and into downwardly extending projections from the lever 90. A pin 94 extends upwardly from the lever 90 into the spiral groove 81, and a spring 95 between the bottom of the bracket 92 and the lever 90 urges the pin resiliently into the groove. The arrangement is designed so that downward movement of the control knob 34 moves the lever 90 pivotally downwardly about the axis of the rivets 93 and against the force of the spring 95, so that the pin 94 may be lowered to a position beneath the cam wheel, whereupon sideward movement of the knob 34 effects the pivotting of the lever 90 about the axis 91 so that the pin can be selectively positioned in any course desired of the spiral groove.

Referring again to FIGS. 4 and 5, the control knob 36 is connected to a horizontally extending control lever 100 pivotally mounted to the chassis 70 about the axis 101. A bushing 102, as also shown in FIG. 6, is provided in the lever 100 for rotatably supporting a shaft 103. The top of the shaft is provided with a friction wheel, for example a rubber sleeve 104 in radial alignment with the friction wheel 72. Beneath the sleeve 104 a further friction wheel 105 is provided on the shaft 103. The shaft 103 extends downwardly through an aperture 106 in the chassis 70, and a pulley 107 is mounted on the lower end of the shaft. The sleeve 104 is adapted to rotate the friction disk 72 upon proper alignment of the lever 100, and thus is of substantially less diameter than the friction wheel 105 which is adapted, as will be explained in further detail, to rewind the film in the cassette. A motor 110 is also mounted on the chassis 70, the motor having a vertical shaft extending downwardly through the chassis 72 and affixed to a pulley wheel 111. For cooling purposes, the shaft of the motor may extend upwardly to a fan blade 112. A belt 113 is provided extending the pulley 111 and the pulley 107.

As seen in greater detail in FIG. 6 the film rewind system is comprised of a recess 115 in the bottom 57 of the recess 33, with a bushing 116 being provided in the bottom of the recess 115. The rewind wheel 55 carrying the pins 57 is affixed to a shaft 117 extending downwardly through the bushing 116, and also journaled in the chassis 70. A friction disk 118 is affixed to the shaft 117 and aligned radially with the friction disk 105.

Referring again to FIGS. 4 and 5, a bracket 120 is provided on the upper surface of the chassis 70, and a slide switch 121 is mounted on the bracket 120 with the slide lever thereof 122 facing downwardly. The lever 100 is provided with a pair of upwardly extending projections 123 and 124 respectively adapted to engage the switch lever 122 in the extreme left hand and right hand positions of the lever 100 respectively.

In the neutral position of the lever 100, as illustrated in the drawings, the friction wheels 104 and 105 are separated from the friction wheels 72 and 118 respectively, and the projections 123 and 124 of the lever 100 are out of contact with the switch lever 122. When the control 36 is moved to the right, i.e. to the "Project" position, the friction wheel 104 engages the friction wheel 72 to rotate the take up reel 62, and also to rotate the cam disk 80 by way of the gears 73 and 83. In this position the projection 124 engages the switch lever 122 to close a contact therein, for turning on the projection lamp 65. In the left hand position of the control knob 36, the friction wheel 105 is moved to engagement with the friction wheel 118, to effect the rewinding of the film into the cassette. In this position, the projection 123 engages the switch lever 122 to turn off the switch 122, hence turning off the projection lamp. (The motor 110 may be continuously on during the time the game is played, and if desired a suitable switch 222 may be provided for turning the motor on and off.)

An L-shaped lever 130 is pivotally mounted on the chassis 70 for rotation about a vertical axis 131. An upwardly extending projection 132 is provided on one arm of this lever, the projection 132 being normally in a position to block pivotal movement of the lever 190 to the left at a determined position. A linkage 133 extending between the lever 100 and the other arm of the lever 130 is provided to rotate the lever 130 so that when the lever 100 is in the "Project" position the projection 132 is moved out of the path of the lever 90. The lever 130 may be held in its normal position blocking the lever 90 by means of a spring 134.

Referring again to FIG. 4, the projection lamp 65 is suitably held, by means for example of a clamp 140 to project light through the condensor lens 66, and then through the window 48 in the leg 44 of the cassette. Within the leg 44 of the cassette, a pair of vertical pins 141 are provided to guide the film along the edge of the arm 44 adjacent the notch 47. The sprocket wheel 60 is rotatably mounted by suitable means and positioned so that the pins 61 thereof are in alignment to engage the sprocket holes in the film. The sprocket wheel 60 is provided with internal teeth 142, and a gear 143 is mounted for rotation on a vertical axis 144 with the teeth thereof engaging the teeth 142. The gear 143 rotates a prism 145 in the path of light passing through the film, the prism thereby acting as a shutter. It is to be noted that the movement of the shutter is thus dependent upon the movement of the film, i.e., the film directly drives the shutter by way of the sprocket 60, gear 143 and prism 145. The light from the shutter is then directed to a projection lens 146, and thence to the mirror 67 and mirror 68 as discussed with respect to FIG. 2. If desired, an externally adjustable focus control (not shown) of conventional nature may be provided to focus the lens 146.

Still referring to FIG. 4, the spiral groove 81 is blocked at its inner and outer ends. It will be further noted that at a location of about 1 turn from the inner end of the spiral groove, a relatively sharp outwardly radially extending contour is provided. This contour may also be reflected in similar but less pronounced contour variations in the other turns of the groove in order to simplify construction of the cam, although if desired the other turns may have smooth contours.

In the preferred embodiment of the invention, the perimeter of the reel 62 has a length corresponding to the four times the length of one film sequence, i.e., the length of one selected play on the film, it being understood that each such sequence is of the same length. In this arrangement that the cam disk 80 be geared in a four to one ratio with respect to the reel 62. In order to ensure proper alignment of the apparatus when other than a one to one ratio is employed, a projection 150 is provided on the top of the cam disc 80, and a window 151 (FIG. 2) is provided in the housing to enable aligning of the projection 150 with the window 151. It will be understood, of course, that in light of the following disclosure variations in this relationship may be employed, taking into consideration the perimeter length of the reel 62, the turns ratio between the reel 62 and cam wheel 80, and the locking position of the lever 132.

As noted previously, when the cassette is initially loaded in the apparatus the sprocket holes of the film do not engage the sprocket wheel 60, in order to avoid damage to the film. Many types of systems may be provided to engage the sprocket wheel with the film, one of which is illustrated in FIG. 4. In this arrangement a lever 155 pivotted about an axis 225, for example from the cover of the housing, as one arm 226 adapted to extend through an aperture (not shown) in the recess 58 of the housing to engage the side of the cassette extension 44. The opposite arm of the lever 155 is coupled, by way of a link 156 to the lever 100, the link 156 being suitably shaped to avoid interference with the other components of the apparatus. Thus, when the knob 36 is moved to the "Project" position, the arm 226 urges the cassette to pivot about the axis 43 (FIG. 3) to thereby urge the film against the sprocket wheel. In other positions of the knob 36 the film is disengaged from the sprocket wheel.

In operation of the above described apparatus, it is initially assumed that the lever 100 is in its neutral position, that the motor is turned on, and that the projection light has been turned off.

As above discussed, the offensive player selects the film cassette corresponding to the type of play he desires to make. The cassette may be marked with the type of play corresponding to the film therein by indicia, for example, on the bottom of the cassette, so that the selection will not be apparent to the defensive player. The offensive player then inserts the cassette into the apparatus. This is accomplished by moving the cassette downwardly into the corresponding recess in the housing so that the rewind assembly is aligned with the reel in the cartridge, and the aperture 46 at the film termination member is aligned with the pin 63, so that when the cassette is firmly in the recess 33 the pin 63 extends through the aperture 46. This manner of insertion insures that the sequences on the film are synchronized with the operation of the apparatus. If the apparatus does not have a 1 to 1 ratio between the take-up reel and the cam wheel, in order to insure proper alignment the crank 85 must be turned until the alignment rib 150 is visible in the window 151 before the film cassette is inserted in the device.

The defensive player then selects the defense he wishes to play against the offensive player which he assumes will be made. Having made the selection, the defensive player then depresses the knob 34, to disengage the pin 94 from the spiral groove, and then moves the knob 34 to the right or left to the desired position and releases it, so the pin 94 can once again engage the spiral groove.

The film must next be withdrawn from the film cassette so that the beginning of the play sequence corresponding to the selections of the offensive and defensive players is aligned with the optical system to start a projection cycle. This is accomplished by rotating the crank 37, and consequently winding the film onto the reel 62. Due to the coupling between the take-up reel and the cam wheel, the cam wheel is also thus rotated, and consequently as the film is wound onto the reel 62, the pin 94 is moved inwardly along the spiral groove, thereby moving the lever 90 to the left as viewed in FIG. 4.

When the lever 90, in its leftward movement, strikes the projection 132, it is blocked from further movement, and the resistance to further movement thereof is reflected back to the crank 37, so that the players know that the proper film is now in position for projection.

The part of the operation thus far described illustrates the criteria which are involved in the selection of the take-up reel perimeter, the length of the film sequences, the turning ratio between the take-up reel and the cam wheel, and the positioning of the stop 132. The stop 132 must be positioned to stop the lever 90 at a position at which the remaining inwardly extending groove of the cam wheel corresponds to the length of the film sequence, i.e., the pin 94 will strike the inner end of the groove at the end of the film sequence. Since the length of this portion of the groove is fixed, the angular range must correspond to the length of the film sequences, and each film sequence must therefore be substantially of the same length. An important consideration in the construction of the device lies in the maintenance of synchronization so that the desired film sequences are projected in the proper form. While there are many techniques by which this objective can be accomplished, in order to avoid the necessity for complex and expensive devices, the preferred embodiment of the invention overcomes the problem by establishment of other criteria so that a simple mechanism may be employed which if operated properly will function in the desired manner and which will not be damaged if the instructions are not meticulously followed.

Thus, as stated above, in one embodiment of the invention a 1 to 4 ratio was provided between the take-up reel 62 and the cam wheel 80, so that the perimeter of the take-up reel 62 was ¼ of the length of a film sequence. In this arrangement it was to be noted that to insure alignment prior to the insertion of the cassette into the device it was necessary to align the rib 150 in the window 151. This is due to the fact that there would be four possible angular positions of the cam wheel 80 when the pin 63 is in position to receive the film end, and otherwise the correct position would be not apparent since it would normally be expected that persons would turn the crank 37 without purpose at times other than during the normal play and thus lose track of the proper synchronism. In a similar manner, it is apparent that a sequence of the film may correspond to any integral multiple of the perimeter of the reel 62.

With respect to the spiral groove, it is apparent that since the pin 94 is moved radially during adjustment, a single turn or integral multiple of turns of the wheel should correspond to a film sequence, since otherwise it would be difficult to synchronize the cam wheel with the film sequences. Thus, if a film sequence corresponded to a fraction of the rotation of the cam wheel 80, other means would have to be provided to establish synchronism with respect to some of the sequences. It is also preferred that a single turn of the cam wheel 80 correspond to a film sequence, since additional means would be necessary to establish the proper groove when the lever 90 is adjusted.

Therefore, in order to provide a readily fabricated and economical apparatus which is easily operated and not subjected to damage by improper operation, it is preferred that the length of the sequence of films in a given cassette be equal, and equal to or a multiple of the perimeter of the reel 62, that a single turn of the cam wheel 80 corresponds to a sequence of play on the film and the stop 132 be adjusted in accordance therewith, and that the angular rotation of the reel 62 is equal to or a multiple of the angular rotation of the cam wheel 80.

Continuing now with the operation of the apparatus, as above stated the crank 37 has been adjusted to the point at which the lever 90 contacts the stop 132. At this time, the sequence may be displayed to determine the outcome of the play by moving the control knob 36 to its right hand position, i.e., project. This movement accomplishes four functions, i.e.:

1. The friction disk 104 is moved to the right to contact the friction disk 72 and hence rotate the reel 62 to unwind another film sequence from the cassette.

2. By means of the linkage 133, the stop lever 130 is rotated to move the projection 132 out of the path of the lever 90, so that the reel 62 and cam wheel 80 can rotate.

3. The projection 124 is moved to contact the switch lever 122 to turn on the projection lamp 65.

4. The lever 155 is moved, by means of the linkage 156, to urge the cassette to pivot about the reel axis thereof to thereby permit engagement between the sprocket holes in the film and the sprocket wheel 60.

At this time, the sprocket 60 will rotate as the film is wound onto the take-up reel 62, and as a consequence the gear 143 will rotate the prism 145 to act as a shutter, and the film sequence will be displayed on the screen 32. It is to be noted that no synchronization is required between the shutter mechanism, which is operated solely by movement of the film, and the reel 62. The absence of the requirement of positive synchronization greatly simplifies the apparatus, and the simplified construction is economical and cannot readily be damaged.

After the cam wheel 80 has rotated for a single turn, the pin 94 has been moved to the inner end of the spiral groove, and the further rotation of the cam wheel 80, and hence the reel 62 is thereby stopped. At this time the final frame of the film sequence appears on the screen 32. If desired, the final frame may include indicia indicating the outcome of the play, for example, the yardage gained or lost and, if desired, the time of the play. While in the embodiment of the invention above described rotational force may still be applied to the friction wheel 72, it has been found that the film has adequate strength that no damage will occur thereto.

At this time, the players may adjust the playing board in accordance with the outcome of the play. The apparatus is then placed in condition for the next play by moving the knob 36 to its left hand position, i.e., "Rewind". As the knob is withdrawn from its right hand position, the lever 155 is moved away from the edge of the cassette, so that the sprocket holes in the film are disengaged from the sprocket 60. At the start of the movement of the knob 36, the force on the lever 130 transmitted by way of the linkage 133 is relieved, but the lever 130 will remain in its unblocking position until the lever 90 is moved backwardly during the rewinding operation. When the knob 36 reaches its left hand position, the friction wheel 105 engages the friction wheel 118 to effect the rewinding of the film into the cassette, and the projection 123 engages the switch lever 122 to turn off the projection lamp. As the film is being rewound into the cassette, the reel 62 is of course being rotated, and the rewinding continues until the film is entirely rewound and the film termination member 45 restrains further movement of the film due to the completion of the unwinding of the film from the reel 62.

The knob 36 is thence moved to its neutral position, to disengage the friction wheel 105 from the rewind friction wheel 118, and the cassette 40 may then be removed from the recess 33 by picking it up.

The apparatus may now be prepared for another play sequence as above described.

In a further embodiment of the invention, as illustrated in FIG. 8, the cam wheel may be replaced by a cylinder 160 having a spiral groove in its outer periphery. The cylinder 160 is coupled by means of a gear 161 to rotate with the reel 62. While the reel 62 is shown only diagrammatically in FIG. 8, it will be apparent that a gear 162, coupled to the gear 161, is mounted on the shaft 75 for rotation with the reel 62. Although the groove 162 in the cylinder 160 is helical, it is formed in accordance with the considerations above discussed with reference to the embodiment of FIGS. 1-7. The embodiment of FIG. 8 shows the crank 37 being connected to rotate the cylinder 160 by way of shaft 164, i.e., the cam cylinder 160 is driven by the crank which in turn effects the rotation of the take-up reel 62 during the initial setup of the film sequence. This technique may also be employed alternately, if desired, in the arrangement of FIGS. 1-7, although it is less convenient to drive the cam wheel 80 of FIGS. 1-7 by this technique. Alternatively, of course, in the arrangement of FIG. 8 the crank 37 may be coupled to the take-up reel in the manner of FIGS. 1-7.

In place of the lever 90 and pin 94 arrangement of FIGS. 1-7, the system of FIG. 8 employs a pin 166 resiliently urged into the groove by means of a spring 167. The other end of the pin 166 is connected to an operating knob 168. The pin 166 extends to a slot 169 in the apparatus housing, for example through a sliding bushing 170 to permit free sliding movement of the pin. Thus the spring 167 may extend between the bottom of the bushing 170 and a block 171 affixed to the pin. It is thus apparent that the pin 166 may be removed from the groove 162 by pulling the knob 168 out, and the pin may be moved to another course of the groove by sidewise movement of the pin 166 in the slot 169 to permit adjustment of the form above described with reference to the embodiment of FIGS. 1-7.

A stop lever 175 pivotally mounted upon axis 176 has a projection 177 positioned to engage the block 171, and another projection 178 coupled to a linkage 179. This stop lever 175 serves the function of the lever 130 of FIG. 4, and the linkage 179 is thus coupled to the project-rewind lever of the apparatus so that the projection 177 blocks movement of the pin 166 at a point one turn from the inner end of the spiral groove in the neutral and rewind positions of the control, and moves the projection 177 out of the way of the block 171 in the project position of the control.

Aside from the above described details, the apparatus of FIG. 8 may be the same as that of FIGS. 1-7.

In a further embodiment of the invention as illustrated in FIG. 9, the film cassette 180 is of the same general form as that previously discussed, with the exception that it is considerably deeper, i.e., to hold a film of greater width. For example, as illustrated in FIG. 10, the film may be sufficiently wide to have four complete side-by-side sequences. In addition, the wide film of FIG. 10 may also have film sequences in series in each track. While only four side-by-side tracks, and two sequences in each track are illustrated, it will be apparent that these selections are arbitrary only, and that more or less side-by-side tracks and additional sequences in each track may be provided. This arrangement enables the presentation of a larger number of plays on each film cassette. As shown in FIG. 10, each track of the film is provided with its own sprocket holes 181 adjacent thereto, these sprocket holes being punched into a standard wide film which has sprocket holes 182 on one edge thereof which are not necessarily employed in the apparatus of FIG. 9.

As further illustrated in FIG. 9, the take-up reel 183 and its pin 184 for holding the film have also been lengthened to accommodate the increased width of film, and of course the film and element 185 insertable over the pin 184 on the reel has also been widened. In order to accommodate the increased width of film, the rewind apparatus may be in the form of a rectangular bar 186 driven by the rewind wheel 187, for example by means of the friction wheel arrangement described with reference to FIGS. 1-7, with the reel 188 of the cassette having a central aperture 189 shaped to receive the bar 186. The bar 186 is of course sufficiently long to adequately engage the aperture 189 during rewind.

In addition, a lead screw 190 is provided, having an axis parallel to the axis of the reel 183, with a gear 191 being provided to rotate the lead screw 190. A selection gear 192 is coupled to the gear 191, the gear 192 being operable from a position exterior of the housing, for example of means knob 193, to permit a defensive player to set the lead screw 190 as desired. In order to provide an indication of the rotation of the lead screw, for example, suitable indicia such as numerals 194 may be provided on the gear 192 and visible through a window (not shown) in the housing of the apparatus.

The modification of FIG. 9 also provides a tray 195 into which the cassette 180 may be inserted, and a nut 196 affixed to the tray 195, so that the cassette 180 may be moved parallel to the axis of the lead screw 190, as shown by the arrows 197.

As in the previously discussed arrangements, the apparatus of FIG. 9 also includes a projection lamp 65 and condensor 66, a shutter mechanism including the sprocket wheel 60 and objective lens 146. These optical elements are positioned in a fixed location, so that by movement of the cassette in the direction indicated by the arrows 197 the optical system may be selectively aligned with any of the tracks on the film.

As in the previously described arrangements, the film cassette of FIG. 9 is inserted in the apparatus in the same general manner, although in this case the cassette is inserted in the tray 195. The aperture 198 in the cassette aligned with the sprocket wheel of course extends throughout the width of the cassette, and the optical window opposite the aperture 198 (not shown) also extends across the width of the cassette, although this window may be in the form of a plurality of parallel windows, with a separate window aligned with each track. After the cassette has been inserted, the defensive player may then rotate the knob 193 to selectively move the cassette in the direction of the arrows 197, and thereby select the track that will be projected.

The arrangement of FIG. 9 may be provided with a cylindrical cam 160 and crank 85 as in the arrangement of FIG. 8, although alternatively a cam wheel of the form of that illustrated in FIG. 4 may be employed, to permit the selection by the defensive player of the sequence of film to be shown in any selected track.

Aside from the above discussed modifications, the apparatus of FIG. 9 will be essentially similar to that of the previously discussed arrangements.

As above noted, with reference to FIG. 1, a time dial 27 was included on the score board for keeping track of the time, and thus limiting the period of play of a full game. If desired, any one of a number of techniques may be employed for automatically keeping track of time in a manner simulating the passage of time in an actual football game. For example, referring to FIG. 11, the cassette 40 may be provided with a downwardly extending pin 200, with the lengths of pins on different cassettes having different links if desired. A ratchet wheel 201 mounted for rotating a shaft 202 may be provided within the housing, for example one face 203 of the wheel 201 having ratchet teeth 204 spaced thereabout. A resilient arm 205 is positioned against the face of the wheel 201 to engage the ratchet teeth 204, the end 206 of the spring 205 being mounted in a fixed position within the housing by any conventional means. For illustrative purposes only, the shaft 202 is shown connected to a spur gear 208, which in turn rotates a dial 209 by means of a gear 210 affixed thereto. When the cassette 40 is inserted in the apparatus, the pin 200 extends through an aperture, for example the aperture 211 in FIG. 2, and engages the spring 205. The ratchet teeth 204 are bevelled so that the downward movement of the spring 205 does not effect the rotation of the ratchet wheel, in order to avoid giving a clue to the defensive player as to the cassette which has been selected. When the cassette is removed, the spring 205 moves upwardly, thereby effecting the rotation of the ratchet wheel, and consequently the rotation of the dial 209. The dial 209, which may be positioned to be visible in a window 212 in the housing, as illustrated in FIG. 1, is provided with suitable timing indicia. Consequently, each time a cassette is removed, a determined advance of time will appear on the dial 209. In order to reset the timing dial, a knob 213 may, for example, be affixed to the dial and available externally of the housing as shown in FIG. 1. While a simplified coupling arrangement has been illustrated in FIG. 11, this arrangement has been employed for illustrative purposes only, and obvious mechanical expedients may be employed to adapt this type of structure within the housing of the shape illustrated in FIG. 2.

FIG. 12 illustrates a preferred embodiment of an electric circuit to be employed in the apparatus above described. The induction motor 110 has a main winding 220 connected to a suitable plug 221 by way of a switch 222, which constitutes the ON-OFF switch of the apparatus illustrated in FIG. 2. The induction motor 110 is preferably of the type having a secondary low voltage winding 223, and this winding is coupled to the projection lamp 65 by way of the switch 121. This provides a convenient and simple technique for energizing the projection lamp, which may conveniently be in the form of a high intensity automotive lamp.

While in the above described embodiments of the invention a separate cam disc 80 or cylinder 160 were employed, it will be apparent that the spiral groove may be integrally provided with the take-up reel, for example in the form of a spiral groove in the take-up reel assembly. Further, in order to avoid reliance solely upon friction, when the crank 37 is turned, to indicate that the crank has been turned far enough, a switch may be provided, connected to a suitable externally visible light, so that the light turns on when the lever 90 engages the stop lever 130.

The selection of the defensive play may be simplified by providing suitable cards, with indicia corresponding to different types of defensive plays, that can be temporarily affixed in a suitable holder adjacent the selector knob 34. For example, if the defensive player reasons that the offense will try a long pass play, he will select a defense indicating card corresponding to long pass plays and place it on the apparatus, the card indicating the correspondence between the position of the lever 34 and defensive plays available against a long pass.

As above noted, the operation of the crank 37 may be automatic, for example the take-up reel may be operated by the motor 110 by means of suitable coupling, so that upon selection of the defensive play and actuation of the device the winding of the film on the take-up reel and the functions of the machine in the "Project" position may automatically occur in the required sequence.

As a further alternative, the film sequences may be arranged on the film with the frames of each sequence regularly appearing throughout the length of the film.

In other words, in each group of N sequential frames on the film, where N is the total number of film sequences, a single frame from each film sequence will appear. In this embodiment of the invention, of course, the above described film winding selecting apparatus may be dispensed with, so that conventional film winding apparatus may be employed, and a suitable system may be provided for the shutter to permit the showing of only one selected frame during each N successive frames of the film.

As usual herein, "equal" modifying lengths of film sequences, is used as a convenience as it should be clear that while the length could be equal, instead, in order to provide for speed differential resulting from peripheral build up on the take up reel, each sequence, in order, may be slightly longer.

While the invention has been disclosed and described with reference to a limited number of embodiments, it will be apparent that many variations and modifications may be made therein without departing from the invention. For example, as above noted, while the game has been specifically described with reference to a game simulating football, it will be apparent that the teachings therein may be advantageously employed in apparatus simulating other games, or alternatively, in apparatus designed independently of conventional sports. It is therefore intended in the following claims to cover each such variation and modification as falls within the true spirit and scope of the invention.

What is claimed is:

1. A game simulating a sports activity, comprising a plurality of reels of film each having a plurality of equal length sequences of play of said activity regularly arranged thereon, and a selective projecting apparatus adapted to singly receive said reels for projection, said apparatus comprising means for selectively advancing film from a selected reel received thereby to project a determined sequence and for inhibiting projection of more than said determined sequence said means for selectively advancing film comprising a take-up reel having a perimeter of a length having a determined relationship to the length of said sequences, means for affixing the end of a selected reel of film to said take-up reel, and means for rotating said take-up reel to wind thereon a length of film equal to an integral number of sequences of said film, a rotatable element coupled to rotate with said take-up reel and having therein a spiral groove, pin means engaging said groove, selector means coupled to said pin means to permit changing of the position of said pin means in said groove, means inhibiting movement of said pin means in one direction at a point at which the remainder of said groove in said direction corresponds to the length of sequence on said film, and release means for releasing said stop means to permit rotation of said take-up reel whereby said take-up reel can rotate to wind thereon a length of film corresponding only to one sequence of film.

2. The game of claim 1 wherein said element is comprised of a wheel having a spiral groove in one surface thereof.

3. The game of claim 1 wherein said element is comprised of a cylinder having a helical groove in its outer periphery.

4. The game of claim 1 wherein said stop means is positioned to stop the rotation of said element one turn from the end of said groove, a rotation of said element corresponds to an integral number of rotations of said take-up reel, and the length of a sequence of said film is equal to an integral number times the length of the perimeter of said take-up reel.

5. A film selecting apparatus comprising a take-up reel for winding film thereon, means for rotating said reel, a selecting control means coupled to said reel, said control means comprising a first member mounted to move in a given locus in response to rotation of said reel, means for selectively moving said member to positions on said locus separated from each other by distances corresponding to a determined angular displacement of said reel, first and second stop means positioned to inhibit movement of said member at first and second positions respectively on said locus separated by a distance corresponding to said determined angular rotation of said reel to thereby inhibit rotation of said reel in a film winding direction, with said first stop means being positioned before said second stop means in the film winding direction, and means for releasing said first stop means.

6. The film selecting apparatus of claim 5 wherein said selecting control means comprises an element rotatable with said reel and having a spiral groove, said first member comprising pin means mounted to ride in said groove, and wherein said means for selectively moving said member comprises means for releasing said pin means from said groove and moving it to another course of said groove along said locus.

7. The film selecting apparatus of claim 6 wherein said means for selectively moving said member comprises a lever, said pin means being mounted on said lever, and means for resiliently urging said pin means toward said groove.

8. The film selecting apparatus of claim 6 wherein said rotatable element comprises a wheel having a spiral groove in one surface thereof, one end of said groove being blocked to form said second stop means.

9. The film selecting apparatus of claim 6 wherein said element comprises a cylinder having a helical groove in the outer surface thereof, one end of said groove being blocked to form said second stop means.

10. The film selecting apparatus of claim 6 comprising a motor, clutch means operatively connected to couple said motor to drive said reel in the film winding direction, said clutch means comprising means for releasing said first stop means when said motor is coupled to drive said reel.

11. The film selecting apparatus of claim 5 further comprising a cassette including a reel of film, coupling means on the free end of said film, and means releasably attaching said coupling means to said take-up reel at a determined angular position of said take-up reel.

12. The film selecting apparatus of claim 11 wherein said film includes a plurality of equal length sequences of information serially arranged thereon, each of said sequences having a length that is an integral number times the length of the perimeter of said take-up reel.

13. The film selecting apparatus of claim 11 comprising a motor, clutch means for selectively coupling said motor to said take-up reel for winding film thereon and to said reel of film for rewinding film thereon, said coupling means including means coupled to said means for releasing said first stop means when said motor means is operatively coupled to rotate said take-up reel.

14. The film selecting apparatus of claim 13 further comprising an optical projection system including a projection lamp and means for projecting light from said lamp through said film between said take-up reel and reel of film, and switch means connected to energize said projection lamp, said apparatus further comprising means coupled to said clutch means for closing said switch means when said motor means is operatively coupled to said takeup reel, and for opening said switch means when said motor means is operatively coupled to rewind said film.

15. The film selecting apparatus of claim 14 wherein said optical system further comprises shutter means, said film having sprocket holes, said shutter means comprising a sprocket reel for engaging said sprocket holes for driving said shutter means, and wherein said apparatus further comprises means coupled to said clutch means for urging said film into operative connection with said sprocket means when said motor means is operatively coupled to said take-up reel.

16. The film selecting apparatus of claim 15 wherein said shutter means comprises a prism positioned in the path of light from said projection lamp, said sprocket being operatively connected to rotate said prism.

17. The film selecting apparatus of claim 11 wherein said cassette includes a leg portion through which said film extends, said leg portion having aligned apertures on opposite sides thereof, and wherein said apparatus comprises an optical projection system for directing projection light through said apertures.

18. The film selecting apparatus of claim 17 further comprising a shutter means including a sprocket wheel, said sprocket wheel being operatively positioned to engage sprocket holes in said film through one of said apertures in the leg of said cassette.

19. The apparatus of claim 11 further comprising time indicating means, said cassette having thereon a projection, and means responsive to the length of said projection for advancing said time indicating means.

20. The film selecting apparatus of claim 5 further comprising a cassette of film having a plurality of side-by-side tracks, said apparatus having an optical projection system between said reel of film and said take-up reel, and further comprising means for selectively positioning said tracks of film in the path of said projection system.

* * * * *